United States Patent
Putz et al.

(10) Patent No.: US 10,951,658 B2
(45) Date of Patent: Mar. 16, 2021

(54) IT COMPLIANCE AND REQUEST FOR PROPOSAL (RFP) MANAGEMENT

(71) Applicant: Tugboat Logic, Inc., Burlingame, CA (US)

(72) Inventors: Ingrum Putz, Half Moon Bay, CA (US); Raymond Kruck, Burlingame, CA (US); Harold Nguyen, Burlingame, CA (US); Christopher Cross, Calgary (CA); Scott Sturgeon, Calgary (CA)

(73) Assignee: Tugboat Logic, Inc., Burlingame, CA (US)

( * ) Notice: Subject to any disclaimer, the term of this patent is extended or adjusted under 35 U.S.C. 154(b) by 260 days.

(21) Appl. No.: 16/013,037

(22) Filed: Jun. 20, 2018

(65) Prior Publication Data

US 2019/0394238 A1     Dec. 26, 2019

(51) Int. Cl.
  *H04L 29/06*     (2006.01)
  *G06N 3/08*     (2006.01)
(52) U.S. Cl.
  CPC .............. *H04L 63/20* (2013.01); *G06N 3/08* (2013.01)
(58) Field of Classification Search
  CPC .................................. H04L 63/20; G06N 3/08
  See application file for complete search history.

(56) References Cited

U.S. PATENT DOCUMENTS

| | | | |
|---|---|---|---|
| 6,356,909 B1* | 3/2002 | Spencer | G06F 16/958 |
| 2001/0051913 A1* | 12/2001 | Vashistha | G06Q 40/04 |
| | | | 705/37 |
| 2003/0084014 A1 | 5/2003 | Sohrabi et al. | |
| 2010/0106653 A1 | 4/2010 | Sandholm et al. | |
| 2011/0251865 A1* | 10/2011 | Yuen | G06Q 10/087 |
| | | | 705/7.11 |
| 2012/0041769 A1 | 2/2012 | Dalal et al. | |

(Continued)

FOREIGN PATENT DOCUMENTS

WO     2001-061593 A1     8/2001

OTHER PUBLICATIONS

Motahari-Nezhad et al., RFPCog: Linguistic-Based Identification and Mapping of Service Requirements in Request for Proposals (RFPs) to IT Service Solutions, Jan. 2016, 49th Hawaii International Conference on System Sciences, pp. 1691-1700 (Year: 2016).*

(Continued)

*Primary Examiner* — Kenneth W Chang
(74) *Attorney, Agent, or Firm* — Asif Ghias

(57) ABSTRACT

Techniques for automating/streamlining the process of responding to a security/privacy RFI/RFP as well as monitoring the security/privacy/IT compliance of an organization are disclosed. For this purpose, a variety of data sources, internal and external to the organization, are employed. A set of machine learning algorithms are also used that find the most appropriate item in the database of data sources that match any given question/item of the RFP. Based on this matching, the RFP question is answered in an automated or a semi-automated manner. The compliance of the organization against a given policy or set of controls is monitored and any observed security/privacy gaps/risk are identified. Recommendations on overcoming the gaps are further provided to the organization.

21 Claims, 8 Drawing Sheets

(56) References Cited

U.S. PATENT DOCUMENTS

| | | | |
|---|---|---|---|
| 2013/0124244 A1* | 5/2013 | Johnson | G06Q 10/0631 |
| | | | 705/7.12 |
| 2013/0159277 A1* | 6/2013 | Liu | G06F 40/211 |
| | | | 707/709 |
| 2013/0246217 A1* | 9/2013 | Denton | G06Q 30/0206 |
| | | | 705/26.7 |
| 2013/0340030 A1* | 12/2013 | Riley | H04L 63/102 |
| | | | 726/1 |
| 2014/0365555 A1 | 12/2014 | Jwalanna | |
| 2016/0189198 A1 | 6/2016 | Mckenzie et al. | |
| 2016/0371369 A1 | 12/2016 | Cormack et al. | |
| 2017/0032035 A1* | 2/2017 | Gao | G06N 3/08 |
| 2017/0103441 A1 | 4/2017 | Kolb et al. | |
| 2017/0132203 A1 | 5/2017 | Kim et al. | |
| 2017/0132313 A1 | 5/2017 | Kukla et al. | |
| 2017/0243028 A1* | 8/2017 | LaFever | G06F 21/6263 |
| 2017/0337287 A1 | 11/2017 | Gill | |
| 2017/0357502 A1* | 12/2017 | Barday | G06F 8/70 |

OTHER PUBLICATIONS

Hayes et al., Expert system for development of request for proposal packages and evaluation of proposals, May 1989, Proceedings of the IEEE National Aerospace and Electronics Conference, vol. 3, pp. 1364-1369 (Year: 1989).*

Capterra, "Proposal Management Software", https://www.capterra.com/proposal-management-software/, Apr. 10, 2018, VA, USA.

Loopio, "Customer Success Story", https://www.loopio.com, Apr. 10, 2018, Toronto, Canada.

Loopio, "RFP Software | Respond to RFPs with Loopio", https://www.loopio.com, Apr. 10, 2018, Toronto, Canada.

Qvidian, "Qvidian Proposal Automation Advantage: The inciteKnowledge Migration Opportunity", Connect11 Conference, Apr. 11, 2011, FL, USA.

* cited by examiner

*Fig. 4*

Policies / PH-014 Passwords

304

○ Policy   ⊠ Controls   ⚡ Events   ⚙ Usage

| View | History |

⟨ Update Policy ⟩

PH-014 Passwords
*Organization members use strong passwords.*

○ Policy

Acme Corp Password Policy

1.0 Overview

Passwords are an important aspect of computer security. They are the front line of protection for user accounts. A poorly chosen password may result in the compromise of Acme Corp's entire corporate network. As such, all Acme Corp employees (including contractors and vendors with access to Acme Corp systems) are responsible for taking the appropriate steps, as outlined below, to select and secure their passwords.

2.0 Purpose

The purpose of this policy is to establish a standard for creation of strong passwords, the protection of those passwords, and the frequency of change.

3.0 Scope

The scope of this policy includes all personnel who have or are responsible for an account (or any form of access that supports or requires a password) on any system that resides at any Acme Corp facility, has access to the Acme Corp network, or stores any non-public Acme Corp information.

4.0 Policy

4.1 General

- All system-level passwords (e.g., root, enable, Windows admin, application administration accounts, etc.) must be changed on at least a quarterly basis.

*Fig. 5*

Policies / PH-014 Passwords

306

⊙ Policy    ▣ Controls    ✓ Events    ⋖ Usage

How to implement PH-014 Passwords

Ensure that all applications in use are configured to meet minimum password requirements. Consider using multi-factor authentication in all applications.

Implementation Notes ⓘ

[Save]

X ⧉ 🗐 🗐 | ← → | ୭ ▪ | ✎ ▾ | ▤ Source |
B I S I₂ | ⁝≡ ⁚≡ | ⊧≡ ⇥≡ | ❞ | Styles ▾ | Format ▾ | ? |

*Fig. 6*

Policies / PH-003 Customer Information

308

◎ Policy  ⊠ Controls  ☑ Events  ⚙ Usage

| View | Draft (Draft) | History |

PH-003 Customer Information

*Organization members collect, use and dispose of customer information responsibly.*

◎ Policy

Acme Corp Customer Information Security Policy

1.0 Purpose

Acme Corp maintains a strong commitment to customer information security and protection. This Customer Information Security Policy is intended to help employees determine what information can be disclosed to non-employees, as well as the relative sensitivity of information that should not be disclosed outside of Acme Corp without proper authorization.

The information covered in these guidelines includes, but is not limited to, information that is either stored or shared via any means. This includes: electronic information, information on paper, and information shared orally or visually (such as telephone and video conferencing).

All employees should familiarize themselves with the information labeling and handling guidelines that follow this introduction. It should be noted that the sensitivity level definitions were created as guidelines and to emphasize common sense steps that you can take to protect Acme Corp Confidential information (e.g., Acme Corp Confidential information should not be left unattended in conference rooms).

Please Note: The impact of these guidelines on daily activity should be minimal.

Questions about the proper classification of a specific piece of information should be addressed to your manager. Questions about these guidelines should be addressed to Acme Corp IT.

2.0 Scope

This policy covers all Acme Corp customer information controlled by Acme Corp.

Acme Corp personnel are encouraged to use common sense judgment in securing Acme Corp customer information to the proper extent. If an employee is uncertain of the sensitivity of a particular piece of information, he/she should contact their manager.

*Fig. 7*

Policies / PH-003 Customer Information

○ Policy    ☒ Controls    ☑ Events    ≪ Usage

*How to implement PH-003 Customer Information*    310

Transmission of confidential and sensitive customer information should use an encrypted channel. This is achieved by configuring email clients to only use SSL/TLS when connecting to email servers.

Storage of confidential and sensitive information must be encrypted at rest and limited only to personnel who need access to support customers.

For disposal of hardcopies of confidential and sensitive information, it is recommended to shred all documents and consider use of a vendor such as Iron Mountain or other local vendors. These vendors often offer hardware (hard-drives, etc.) destruction/disposal services as well.

For security incidents, create a checklist and email templates to track events and communicate with customers.

*Implementation Notes* ○

[Save]

*Fig. 8*

IT COMPLIANCE AND REQUEST FOR PROPOSAL (RFP) MANAGEMENT

FIELD OF THE INVENTION

The present invention relates to the field of automatic/automated management of request for proposals/information (RFPs/RFIs) and the monitoring of information technology (IT) compliance and security/privacy gaps/risks.

BACKGROUND OF THE INVENTION

Security and privacy are of paramount concerns to most businesses in today's sensitive environment. There is an ever-increasing need for efficiently monitoring the compliance of an organization against one or more security/privacy policies, frameworks, standards or regulations or against a set of security/privacy controls required in an RFI/RFP. Relatedly, most artisans are aware of the painstaking process, usually involving fire drills and war room efforts, for answering such a security/privacy RFP or the security/privacy questions of an RFP in a timely fashion.

There is no solution in the prior art that addresses the concern of automatically or semi-automatically answering a security/privacy RFI/RFP, which remains a laborious and logistically hard, but yet repetitive process. Furthermore, no solution exists that would combine such an auto-answering capability of an RFP with the related aspect of monitoring the security/privacy compliance of an organization against a set of security/privacy controls.

Yet there is plenty of prior art in this field. US Patent Publication No. 2012/0041769 A1 to Dalal discloses an RFP management system for improving the process of matching researchers with relevant research projects described in RFPs. The system creates a researcher profile based on a scan of the researcher's reports and past proposals and scans web-based and other databases for project opportunities that fit the profile. It then produces a subset of RFPs for the researcher to consider. The system further includes search and matching features that enable identification of expertise among researchers based on their profiles to facilitate collaboration, and to suggest research teams. With the best-matched expertise for each RFP, the user interface allows researchers to refine their profiles and give feedback to allow the system to learn and improve performance.

US Patent Publication No. 2016/0371369 A1 to Cormack discloses systems and methods for classifying electronic information and terminating a classification process utilizing Technology-Assisted Review ("TAR") techniques. In certain embodiments, the TAR process, which is an iterative process, is terminated based upon one or more stopping criteria. In certain embodiments, use of the stopping criteria ensures that the TAR process reliably achieves a level of quality (e.g., recall) with a certain probability. In certain embodiments, the TAR process is terminated when it independently identifies a target set of documents. The TAR process is terminated based upon whether the ratio of the slope of the TAR process's gain curve before an inflection point to the slope of the TAR process' gain curve after the inflection point exceeds a threshold. The TAR process is terminated when a review budget and slope ratio of the gain curve each exceed a respective threshold.

US Patent Publication No. 2017/0132203 A1 to Kim describes a document-based requirement identification and extraction system. The process includes parsing a set of documents and identifying relationships among parsed components of the documents. The process further includes applying the parsed components and identified relationships to a meta-model that defines requirements. The requirements include a statement expressing a need and/or responsibility. It also includes identifying candidate requirements and their candidate topics based on the above process. For each of the identified candidate topics, a feature vector is built from the corresponding candidate requirements. The process also includes training the meta-model with the feature vectors, validating the meta-model and classifying output of the validation. This results in identifying a subset of the candidate requirements and corresponding topics expressed in the set of documents.

US Patent Publication No. 2017/0132313 A1 to Kukla discloses a computerized system and methods for the automated extraction of contextually relevant information from generic document sets. This is done by automatic processing of actionable information from the documents. Their techniques appear to avoid inaccuracies and inefficiencies resulting from conventional and/or human-based document processing techniques.

US Patent Publication No. 2014/0365555 A1 to Jwalanna teaches a computer-implemented method of cloud-computing based content management. The process includes receiving a dynamic content block generated by a user of a client application in a computing device. The dynamic content block is stored in a cloud-storage environment. A search query for the dynamic content block by another client application in another client's computing device is received. The dynamic content block is provided to the second client application. An update to the dynamic content block by the first user is received. The update to the dynamic content block is automatically synchronized to the second client application. Optionally, the dynamic content block can be a wit. The dynamic content block can include a reusable portion of user-generated information such as a portion of a sales document or a repeatedly used email content. A drag and drop operation from the second client application to another application can then be detected.

Non-patent literature (NPL) reference of "Qvidian Proposal Automation Advantage" obtained from Connect11 conference website mentions an auto-answer function of RFPs. Similarly, NPL web page entitled "Supercharge responses to RFPs, RFIs, and Security Questionnaires" obtained from Loopio's website mentions streamlining responding to RFPs and RFIs by using their solution.

Yet there is no solution in the prior art that addresses the concern of automatically or semi-automatically answering an RFI/RFP specifically related to security/privacy domains while utilizing artificial intelligence (AI). Furthermore, no solution to date combines such an RFI/RFP auto-answer capability with IT/security/privacy compliance monitoring for an organization.

OBJECTS AND ADVANTAGES

In view of the shortcomings of the prior art, it is an object of the invention to provide techniques for automatically or semi-automatically answering RFPs related to security/privacy domains.

It is also an object of the invention to monitor the compliance of an organization against a given security/privacy/IT policy or against a specific set of security/privacy controls.

It is also an object of the invention to utilize artificial intelligence techniques in auto-answering security/privacy RFPs and for performing compliance monitoring.

It is further an object of the invention to consult a variety of internal and external data sources to accomplish its objectives.

These and other objects and advantages of the invention will become apparent upon reading the detailed specification and by reviewing the accompanying drawing figures.

SUMMARY OF THE INVENTION

The present invention relates to machine learning based methods and systems of automating the tedious process of responding to a request for proposal (RFP) or a request for information (RFI) document, collectively referred to here as an RFP. Specifically, the focus of the present teachings is streamlining/automating the process of responding to RFPs that are related to security and/or privacy domains. The techniques provide for answering the questions of a security/privacy RFP for an organization in a fully automated or a semi-automated manner. In the preferred embodiment, the benefits of the teachings are accrued by a hosted, multi-tenant web application or system or platform onto which a number of tenants or peer organizations are onboarded.

To achieve its objectives, the instant design employs a variety of privacy/security data sources stored in a database that are consulted by one or more machine learning algorithms. The data sources include a corpus of prior RFP documents that the organization may have responded to as well as a corpus of internal "stock" policies that are available to the organization in the system. These stock policies may already have been implemented by the organization or may be in the process of being implemented or are determined to be applicable to the organization. The data sources utilized by the system further include a corpus of externally sourced documents that the organization would have sourced from external sources.

The external sources include public sources of policy standards and regulatory frameworks available on the internet as well as policies of partner organizations that may be available to the organization in question under an agreement. The externally sourced documents also include policies of peer organizations that may be hosted on the same multi-tenant system/platform in a hosted environment. In such a scenario, the peer policies are accessed in an anonymized manner such that any personally identifiable information (PII) data or other identifying markers have been masked.

The data source used by the system also include inputs provided by an administrator of the organization. These inputs may be in the form of specific controls entered by the admin for the organization as well as any other security/privacy resources/documents that the admin may have deemed relevant to the organization. In a highly preferred embodiment, the corpus of prior RFP documents also includes the RFPs that the peers of the organization in question have responded to.

To facilitate the RFP auto-answer functionality of the system, for each question of the new RFP, the machine learning algorithms find matching items amongst documents from the above data sources stored in the database. Based on the matching items, the system either automatically answers the questions of the RFP and marks the complete. Otherwise, a list of potential matches is presented to the user who may then select a desired match/matches for the system to use to answer the RFP question.

Additionally, the system monitors the compliance of the organization to a given policy or a set of controls thereof. Such a policy may be an industry policy standard amongst the externally sourced documents or a peer policy. It may also be a stock policy that the organization is desiring to implement. In any case, the system compares the set of controls already implemented by the organization against the set of controls prescribed by the above-mentioned policy/policies and identifies any observed gaps/risks to the user. Further, one or more recommendations may be provided to the user on how to overcome the gaps. These include implementing the required controls identified as gaps and/or creating and implementing new policies if required.

For above compliance monitoring, the system preferably utilizes a dedicated monitoring module. In addition, a survey wizard is used to give a survey/questionnaire to the organization at the time of onboarding onto the instant platform or a suitable time afterwards. The instant system, and specifically its monitoring module, then identifies the gaps/risks in the present security posture of the organization. This is done by comparing the currently implemented controls or answers to the survey questions against those required/prescribed in the survey/questionnaire. In this manner, the organization is able to assess its security posture against a given security/privacy policy or a set of controls.

The set of controls against which compliance is monitored are preferably prescribed in the new RFP that the organization is in the process of responding to. Alternatively, they are prescribed in a regulatory framework or revision or policy standard as one of the externally sourced documents. In a highly preferred embodiment, these set of controls are related to a regulatory framework/regulation/law/act such as Health Insurance Portability and Accountability Act (HIPAA) standard, National Institute of Standards and Technology (NIST) standard, Payment Card Industry (PCI) standard, General Data Protection Regulation (GDPR) standard, etc. Alternatively, the set of controls against which compliance is monitored may be related to an audit that the organization is undergoing, for example, a human resources (HR) audit, a financial audit or an information technology (IT) audit. The set of controls may be further related to a peer policy.

Several concepts are effectively applied by the instant techniques in finding matches to an RFP question/item per above and to answer them. These include root question analysis based on root questions/answers and literal questions/answers. Each RFP question is matched to a root question that represents a single human-understandable concept in the system. For each root question, there is a mapping root answer. A root answer has answer conditions. In addition, a literal question consists of the literal wording of the question as phrased in the RFP document. Several literal questions may map to the same root question. A literal answer expresses the root answer in a manner that matches the format/template of the original document.

The machine learning algorithms employ a desired choice from a variety of machine learning techniques for finding matches to RFP questions. These include classification techniques such as Naive Bayesian, k-nearest neighbors (kNN), support vector machines (SVM) as well as (NER) and natural language processing (NLP) techniques. Furthermore, the techniques of term frequency-inverse document frequency (TFIDF or tf-idf) and cosine similarity are also used.

The present invention, including the preferred embodiment, will now be described in detail in the below detailed description with reference to the attached drawing figures.

BRIEF DESCRIPTION OF THE DRAWING FIGURES

FIG. 4 is a screenshot of an implementation of the present teachings showing various stock policies at a high-level.

FIG. 5 shows a portion of a detailed view of an exemplary stock password policy of an implementation of the present teachings.

FIG. 6 shows exemplary requisite controls from the policy of FIG. 5.

FIG. 7 shows a portion from a detailed view of an exemplary stock customer information policy of an implementation of the present teachings.

FIG. 8 shows exemplary controls associated with the policy of FIG. 7.

DETAILED DESCRIPTION

Figure 1:
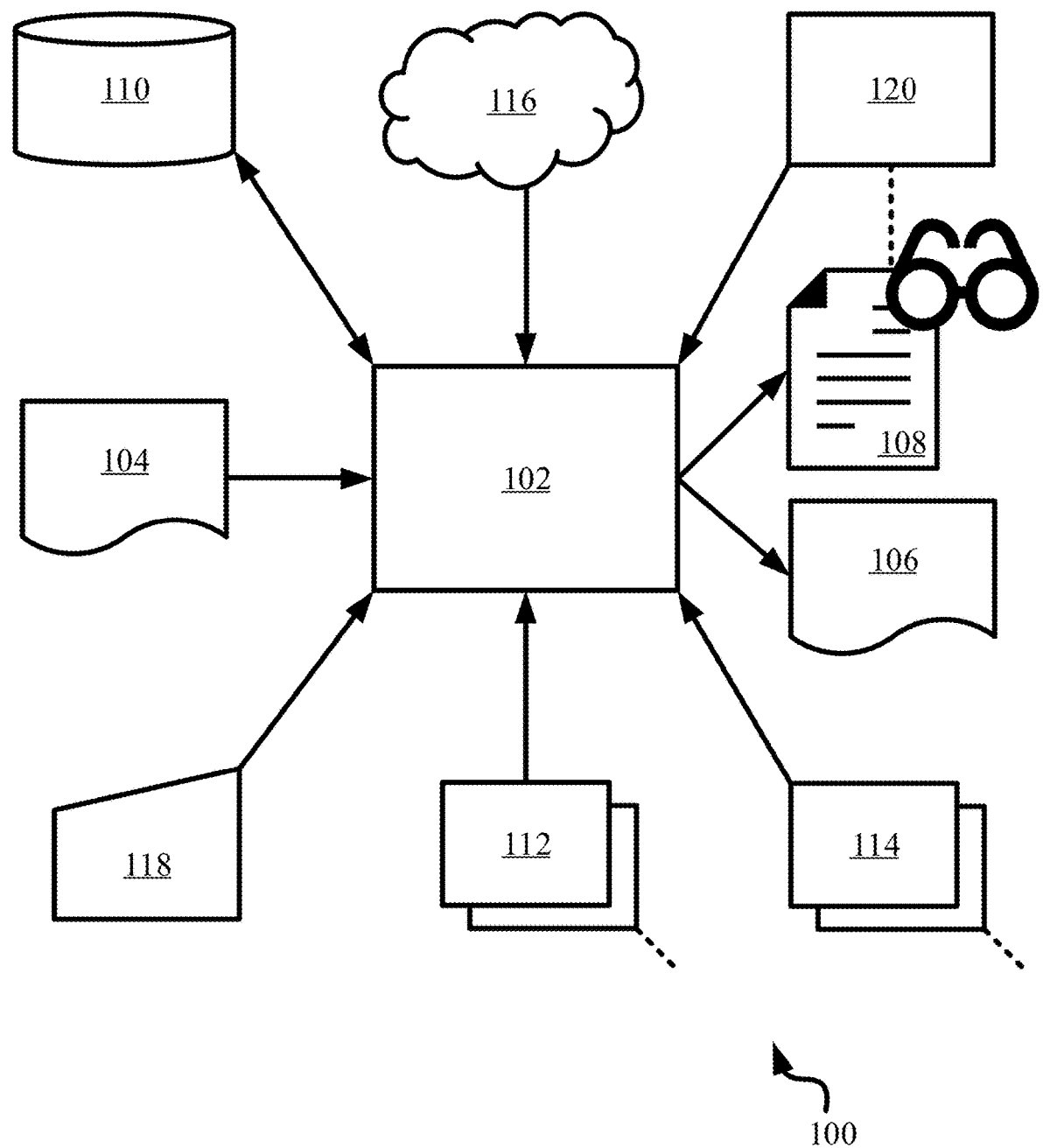
FIG. 1 illustrates a block diagram of the main embodiments of the IT compliance and request for proposal (RFP) management system of the present design.

The drawing figures and the following description relate to preferred embodiments of the present invention by way of illustration only. It should be noted that from the following discussion many alternative embodiments of the methods and systems disclosed herein will be readily recognized as viable options. These may be employed without straying from the principles of the claimed invention. Likewise, the figures depict embodiments of the present invention for purposes of illustration only.

The methods and systems described herein will be best appreciated by reviewing an RFP/RFI management and IT compliance system or platform 100 as illustrated in FIG. 1. For the purposes of this disclosure, we will collectively refer to an RFP and an RFI as just an RFP to avoid unnecessary repetition but with the implicit knowledge that the present techniques apply to automating/streamlining the process of responding to either. System 100 is most typically deployed as a multi-tenant software as a service (SaaS) web application. Various customer organizations or entities or tenants are then onboarded to system 100. The system is hosted and operated by a third-party in a cloud or a hosted platform using techniques known in the art. Organizations that are onboarded to system or platform 100 shown in FIG. 1 accrue the benefits of the various techniques described herein.

RFP management and IT compliance system or platform 100 of FIG. 1 shows a new request for proposal (RFP) document or questionnaire 104 to which a customer organization/entity or simply an organization/entity is in the process of responding. RFP 104 contains questions or requests for responses of security and/or privacy nature among potentially other types of questions. These questions related to IT security and/or privacy domains are provided to an artificial intelligence (AI) and insights engine 102 that is used by system 100 to respond to RFP 104 in a semi-automatic/automated or a fully automatic/automated manner. As a result of the automation afforded by system 100 according to the techniques described herein, a completed RFP 106 is obtained for the organization.

System 100 also has a real-time security and compliance monitoring module or simply monitoring module 120. Working in conjunction with insights engine 102, monitoring module 120 monitors the security posture of the organization and determines any gaps or risks. Module 120 further monitors the compliance of the organization against policy standards and provides results 108 to the organization of its analysis containing the observed risks/gaps as well as recommendations and feedback on overcoming the same. As noted, that in its most preferred embodiment, system 100 is implemented as a multi-tenant web application on which various organizations/entities or customers are onboarded to accrue its benefits. In alternative embodiments, system 100 may be deployed in-house. In further embodiments, monitoring module 120 may be subsumed in AI and insights engine 102 itself.

In order to provide for automatically or semi-automatically answering the questions of new RFP 104 to produce a completed RFP 106 and to provide results 108 of its compliance monitoring of the organization, system 100 makes use of a variety of data sources. These are provided as inputs to AI and insights engine 102 and which as noted, works in conjunction with monitoring module 120. These data sources or inputs include:

1. Prior RFPs. A corpus or collection 112 of prior RFP documents that the organization has previously responded to. AI and insights engine 102 takes advantage of similar or relevant questions previously answered by the organization in responding to other RFPs.
2. Stock policies. A corpus or collection 114 of internal or "stock" policies that are available to the organization in system 100. These stock policies may already have been implemented by the organization or are in the process of being implemented or are otherwise assigned to an owner/user/admin in an organization to be implemented or still otherwise deemed to be applicable to the organization. System 100 allows users of the organization with appropriate privileges to import, draft and/or edit these stock policies for the organization as well as record the implementation of their controls.
3. External resources. A corpus or collection 116 of resources obtained from external sources by the organization. Sources comprising corpus 116 include relevant security/privacy regulations, standards/frameworks or policies available on the internet. These also include policy documents on a peer or partner network and available to the organization under an appropriate agreement with the peer/partner. In a hosted or software as a service (SaaS) implementation of the present design, peers of the organizations may be other organizations or tenants onboarded to system 100 and which have access to their own instance of the multi-tenant SaaS system shown in FIG. 1.
4. Admin-inputs. System 100 further uses inputs 118 entered by an administrator user of the organization. Administrator inputs 118 include specific controls entered by the admin for the organization as well as any other security/privacy resources/documents that the administrator may have deemed relevant to the organization.

The above inputs or data sources of system 100 are preferably tagged and classified according to the teachings described herein and stored in database 110. Note that database 110 is only shown connected to AI and insights engine 102 for clarity of illustration in FIG. 1. It is understood that all elements shown in FIG. 1 will take advantage of database 110, however not all connections between the elements and database 110 are explicitly shown in FIG. 1 for clarity of illustration.

After having reviewed the high-level working of RFP management and IT compliance system 100 illustrated in FIG. 1, let us now look at its functionality in much more detail. According to the instant design, RFP/questionnaire 104 of FIG. 1 may be a document that contains a variety of different questions or items related to a variety of different aspects of the organization's business. Some of those questions may be related to IT security, privacy, risk and compliance posture of the organization. Although, it is questions of these type that are the focus of the auto-answer capability of the preferred embodiment, in other embodiments the below teachings apply to answering questions related to other aspects of the organization as well. The auto-answering techniques will be taught in detail further below.

As already noted, the other key aspect of the present design is the ability to monitor the risk and compliance posture of the organization viz-a-viz a set of policy or standards requirements. As a result of this monitoring, system 100, and specifically its monitoring module 120 provides its observations of security gaps/risks 108 and recommendations to the organization on how to improve its security and/or privacy posture. It may further inform the organization what material benefits will accrue as a result of its compliance.

The collections of documents or corpuses 112, 114 and 116 as well as admin-inputs 118 may come in a variety of formats, including but not limited to Microsoft Word, Microsoft Excel, portable document format (PDF), WordPerfect, etc. All these documents are stored in database 110 in a standardized and normalized database schema. The database schema comprises various tables in which specific privacy/security controls related to these documents are stored.

For example, a table for controls related to password security stores items from the various documents related to password security. These items may be questions, requirements or recommendations related exemplarily to password security. The items are stored in their textual form while database 110 further stores the original documents which the items are associated with. An appropriate database schema construct such as a foreign key ensures the relationship of the items to their respective original documents. Advantageously, any information related to the formatting of the items in their respective documents may also be stored in the same table or appropriately elsewhere in database 110. In a similar manner, there may be a table for controls related to email retention, or for controls related to acceptable use of computer equipment, equipment disposal, etc.

Thus, each document of the above-mentioned data sources of system 100 is decomposed into its constituent items which may be requirements/questions/recommendations/controls and stored in respective tables in database 110. We will sometimes refer to such a collection of tables containing the texts of the individual items of the documents as the working copy of the document. As mentioned that alongside the working copy, the original document is also stored in its unaltered form in database 110.

Before storing the items into the tables, system 100 may preprocesses the texts of the items to perform any necessary cleanup and text normalization. The choice of such preprocessing steps may depend on the requirements of a specific embodiment. More specifically, preprocessing includes one or more of the following steps:

1. Spelling and/or punctuation corrections. Before the contents of the items of the documents is stored, it is processed through a spelling and/or punctuation correction algorithm available in the art to ensure its downstream readability.
2. Stemming and/or lemmatization of the texts of the documents. Those skilled in the art will appreciate that stemming is the process of reducing inflected (or sometimes derived) words to their word stem, base or root form, while lemmatization further accounts for the proper part of speech in the above process to arrive at the lemma of a word. There are a number of algorithms available in the art for stemming and lemmatization that may be used for this purpose. A non-exhaustive list of such algorithms includes Lovins, Porter, Paice/Husk, Dawson, N-Gram, Hidden Markov Model (HMM) and Yet Another Suffix Stripper (YASS) algorithms. These stems/bases/roots/lemmas of the words are stored separately as metadata in the same tables as the items or in separate metadata table(s) of database 110.
3. Removal of stop words. Familiar stop words, such as "the", "is", "at", "which", "on", etc. are also removed from the texts of the items. However, other common words that can be useful in detecting requests or questions such as "please" or "system" are preserved.
4. Tokenization and computation of TFIDF. The documents are also tokenized and the term frequency-inverse document frequency (TFIDF or tf-idf) of each term/token is computed using techniques known in the art. Those skilled in the art will appreciate that TFIDF is a numerical statistic of informational retrieval that reflects how important a word is to a document in a collection or corpus. The TFIDF for each term is also stored as metadata in the same tables as the items or in separate metadata table(s) of database 110.
5. Named Entity Recognition (NER). The documents are also processed with one or more available NER algorithms to extract named entities and/or keywords which are also stored in the metadata. The process extracts predefined categories from the texts, such as the names of persons, organizations, locations, expressions of times, quantities, monetary values, percentages, etc. Available algorithms/techniques in the art that may be used for this purpose include Hidden Markov Models (HMM), conditional random field (CRF), Recurrent Neural Networks (RNNs), and the like. Alternatively, or in addition, natural language processing (NLP) techniques are also employed for this purpose.

Furthermore, weights are assigned to the extracted named entities based on their frequency. The less frequent the term is in all the documents, the more is its weight and vice-versa. This is to normalize the named entities or terms appearing very frequently across multiple corpuses of documents with less weight, with terms appearing less frequently across multiple corpuses with more weights. In one embodiment, weights may thus be assigned using a negative linear relationship.

There may be other preprocessing steps required for a given implementation not included in the above list but within the scope of the main principles being taught. Thus, after preprocessing, the documents are stored in the form of their constituent items stored in various tables of database 110. The precise techniques for decomposing the above documents into their constituent actionable items will be described further below in reference to RFP auto-answering capability of the present design.

Figure 2:
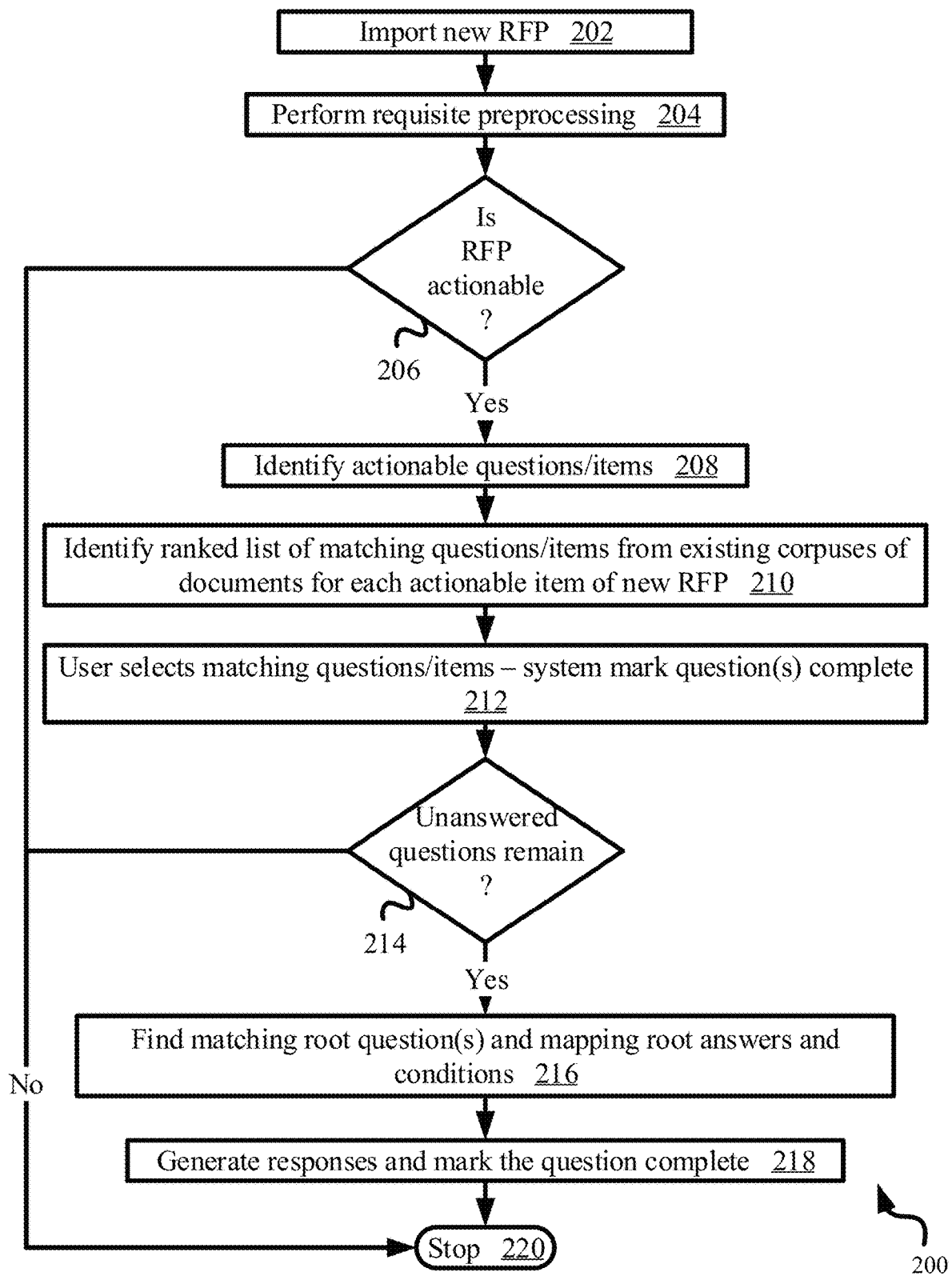
FIG. 2 shows the steps performed by the system of FIG. 1 in a flowchart form in order to achieve its objectives.

RFP Auto-Answering:

For understanding the RFP auto-answering functionality/capability of the present design in detail, let us take advantage of flowchart 200 illustrated in FIG. 2.

New RFP/questionnaire 104 that the organization is responding to, is imported/ingested into system 100 using techniques known in the art. This step is shown by block 202. Then, the RFP is preprocessed using a suitable combination of above preprocessing steps (1) through (5) as required for an implementation. This preprocessing is indicated by block 204.

Next, a determination is made whether RFP 104 is actionable or not. This is because at times a document that appears to be an RFP may actually not be an RFP or not have any actionable items. For example, an RFP in an Excel format may contain several worksheets one of which is just ancillary details about the RFP. If the worksheets are imported as separate documents into system 100, then one worksheet may not be actionable at all. Similarly, a document may apparently look like an RFP and may even be named as such, but without containing any actionable questions or items or requests. Thus, it is advantageous to make a determination whether the overall document is actionable or not. This is indicated by decision diamond 206 in FIG. 2.

The above determination is done algorithmically by AI and insights engine 102 as a classification problem using an appropriate machine learning classification algorithm such as support vector machine (SVM). For this purpose, existing documents are labeled by one or more human experts classifying them actionable or non-actionable. The labelled documents are then provided as training data to SVM. Based on this approach, if new RFP 104 is determined to be actionable or answerable then processing continues to the next steps of flowchart 200, otherwise no further action is taken as shown by terminal oval 220.

Next, the individual items in RFP 104 that need action are identified. This is indicated by block 208 in FIG. 2 and accomplished as follows:

1. First, RFP document 104 is decomposed into its constituent sentences. For well-formed sentences, this is a matter of scanning for a period "." to determine the start of a sentence. If there is poor grammar or missing punctuation marks, then system 100 applies AI and insights engine 102 to the task by first scanning for patterns in sentence structures to determine queues for when a sentence begins or ends. This is done by creating training data with poorly formed sentences containing relevant patterns and sentence structures as inputs, and the beginning and ending of sentences as outputs. The training/labelled data is then provided to an appropriate classification algorithm such as SVM.
2. Once RFP document 104 has been decomposed into individual sentences per above, each sentence is scanned to determine if it is actionable or is a question. For this purpose, the detection of certain keywords and punctuations at certain locations in the sentence or in a paragraph can be enough to identify the sentence as an action item or a question or a request or a recommendation. For instance, the word "Please", "Provide", "What", "Did you", or "Do you" at the beginning of a sentence can indicate a request for a response. Punctuations marks, such as a question mark or colon at the end of a sentence, can also identify a question.
   Additionally, the formatting of original document 104 is also used to assist in identifying actionable items by looking for requisite structural features in the document. Such structural features include the font of the text in the item sentence(s), such as italics, the size of the font, etc. Such structural features further include the background color of the cell of the table containing the item, or the background color of the spreadsheet cell containing the item, if RFP document 104 is in a spreadsheet form.
   Furthermore, machine-learning is also employed to determine/classify actionable items in new RFP 104.

As per earlier teachings, the machine learning algorithms are supplied with labeled training data, where the labels are performed by humans. A practical approach employs a human or a group of humans to label those terms or sentences that indicate a question or an actionable item. Multiple humans are preferred in order to increase accuracy and efficacy of labelled data.

There are a number of such machine learning algorithms that may be used for the above classification. For this approach, the sentences are first converted into n-grams, with n being the number of words. Values of n up to 5 ($n=1$, $n=2$, $n=3$, $n=4$, $n=5$) are used. Then, the choice machine learning classification algorithms includes Naive Bayes, k-nearest neighbors (kNN) and SVM for classification. The feature vectors for an SVM algorithm include lexical features, such as word count or average word length, syntactic features, such as if or not there is an occurrence of a particular punctuation, and structural features, such as the number of paragraphs or lines. Furthermore, deep-learning models, such as Deep Structured Semantic Model (DSSM), can also be used for classification of actionable items, preferably after a collection of 10,000 or more labeled data.

As noted, the above process for detection of actionable questions/items in new RFP 104 is also carried out on all existing documents related to data sources 112, 114, 116 and 118 of FIG. 1, as they get ingested into database 110 overtime. Thus, each document is decomposed into its constituent actionable items which are then stored in tables in database 110 per above explanation.

The actionable items in RFP 104 identified above are then automatically answered according to the teachings described below. Specifically, the answers to these actionable items can come from various sources. These are provided as options via an appropriate mechanism, such as a drop-down menu, of a graphical user interface (GUI) to the user of system 100. The GUI is developed using techniques known in the art which are not delved into detail to avoid detraction from the main principles being taught.

Specifically, the GUI presents each actionable item of new RFP 104 being answered to the user. Below the surface, system 100 employing AI and insights engine 102 searches all the documents in database 110 for possible matches to the items being responded to. This aspect is shown by block 210 of flowchart 200. As taught above, database 110 contains a corpus 112 of prior RFP documents answered by the organization, a corpus 114 of existing stock policies, a corpus 116 of externally sourced documents and a collection 118 of manually inputted documents or controls by an administrator.

After having identified above documents in database 110 with matching items to the question/item of new RFP 104 being responded to, the matching items from the documents are presented to the user. More than one matching items are presented as a list of matches in ranked order of matching/similarity. The matching items presented are selected from the following data sources in order:

1. Corpus 114 of existing stock policies of FIG. 1. If one of these policies with its corresponding matching item is selected by the user via the GUI, then the RFP question/item is marked complete. This is done by incorporating the selected control of the stock policy as the response to the RFP question. Otherwise, the system continues to the following steps.

2. Corpus 112 of previously answered RFPs. If one of these RFPs with its corresponding matching question/item is selected by the user via the GUI, then the RFP question/item is marked complete. In a similar manner as before, this is done by incorporating the answer to the selected question of the prior RFP as the response to the present RFP question. Otherwise, the system continues to the following steps.

In a highly preferred embodiment, corpus 112 of FIG. 1 is extended to include all prior RFP documents that peer organizations of the organization in question have responded to. Thus, in this embodiment, corpus 112 contains RFP documents that all tenants/peers on system/platform 100, including the organization in question, have previously responded to. The list of above-explained matching items presented to the user thus includes the matching questions/items from the peer organizations also. These matching peer items are presented to the user in an anonymized manner.

Preferably, the system weights the matching peer items by the number of peers that have responded to the item/question, or a similar item/question based on present teachings of similarity, by a given answer. Then, as a matching peer item/question is presented to the user in the GUI, the system further shows to the user that "5 of your peer organizations have answered this question as follows . . . ". This gives the user additional insights of the industry-wide acceptability/popularity of a given answer for a specific RFP question.

Alternatively, the weighting is done based on financial or marketing or another value metric ascribed to the RFP, or still using other approaches. Still alternatively, the weighting of the peer item is done based on whether the answer by the peer to the matching/similar peer item/question resulted in a successful RFP. In a similar manner as before, the RFP question is marked complete by incorporating the answer to the selected question of the prior peer RFP as the response to the present RFP question.

3. One of IT security/privacy policies from a peer organization per above teachings. Such policies comprise corpus 116 of externally sourced documents as also taught above. Note, that if a matching peer item has been selected for the response to the RFP question per above, then it may not be necessary to use a peer policy. However, if one of such peer policies is selected, then the system recommends updating an existing policy of the organization if necessary or offers creating a new policy with the controls required to gain compliance with the peer policy. The peer policy is retrieved by the system in an anonymized manner so any personally identifiable information (PII) data or identifiers are masked out. Thus, the system creates a policy and controls for review. Next, the user marks the new policy as applicable and implements its controls, and the question is marked complete per above. Otherwise, the processing continues.

4. One of industry accepted security/privacy frameworks residing in corpus 116 of externally sourced documents. If selected, the system recommends updating an existing policy if necessary or creating a new policy with the controls required to gain compliance. The system creates a policy and controls for review. Next, the user marks the new policy as applicable and implements its controls, and the question is marked complete per above teachings.

5. The matching item/question may also come from corpus 118 of administrator provided inputs, controls or documents. The user may then select the matching admin-inputted control, and the question is marked complete per above teachings.

The above aspects of the selection of a matching document from corpuses 112, 114, 116 and 118 of FIG. 1 and marking the RFP item complete is shown by block 212 in flowchart 200.

However, if after having performed the above steps, any unanswered questions still remain in new RFP 104, then processing continues to the following steps of automatically generating RFP responses. This is shown by decision diamond 214 in FIG. 2. If no answered questions remain, then processing stops per terminal 220. To facilitate this, each of the questions/items of existing documents as well as the questions/items of new RFP 104 being answer are mapped to a "root question".

Root Question Analysis:

A root question has the following qualities:
- It represents an enquiry about a single, human-understandable concept
- It is independent of any particular phrasing
- It has a unique ID that can be used for matching suitable answers System 100 of FIG. 1 contains a library or collection of root questions in database 110. One or more questions/items of the new RFP may map to each of the root questions in database 110. The library of root questions of existing data is developed by a combination of human judgement and machine-learning clustering techniques, such as k-means clustering. Thus, the text of all existing documents is processed to find clusters of words and concepts, and the clusters with a density above a desired threshold are identified as root questions. A human expert further vets the clusters to ensure that the clusters identified indeed qualify as root questions or otherwise which clusters do.

In contrast to a root question, the many ways of asking the same root question are referred to as "literal questions". A literal question is the raw text of the individual questions/items of the existing documents as well as the actionable questions/items of the RFP with minimal preprocessing. A literal question is typically mapped onto exactly one root question, although there are special cases where the literal question is complex, long or ambiguous or it may contain multiple related questions. In such a scenario, the same literal question may reasonably map to more than one root questions.

On the other hand, many literal questions may typically map onto the same root question. The following are exemplary literal questions mapping to the same root question because they are about the same fundamental concept. Note that not all of these are necessarily phrased in a question form, although for the purposes of this disclosure we will still refer to these various phrasings as "questions".

What is your password policy?
How are strong passwords mandated by your organization?
What constitutes a strong password?
Please describe your password policy?
Password policy:
Do you have a password strength requirement? Please describe.

Thus, the first step towards answering a literal question is to map it to a root question. As noted, that typically, there will be only one matching root question. If a literal question maps to more than one matching root questions, then the system advantageously presents a list of matching root questions ranked according to similarity of the match. Thus, to answer such a literal question, answers to multiple root questions may be combined to form a more complete answer for new RFP 104.

In a similar manner, a "root answer" represents a single conceptual answer, independent of any particular phrasing or presentation. A root answer has one or more of the following qualities:

It is a Boolean value: Yes or No

It is implemented by a particular control

It related to a particular security/privacy policy

It is not relevant or Not Applicable

A root question may have multiple associated root answers however, a root answer should only be map to a single root question. Root answers also have answer conditions. Answer conditions allow the system and/or the user to filter out irrelevant root answers from the list of potential matches. Various types of answer conditions may be expressed, examples of which are given below:

Size of the organization

Industry of the organization

Locale of the organization

A particular policy that the organization has implemented

A particular policy above a given revision number that the organization has implemented A particular security control that the organization has enabled/enacted A specific awareness threshold that the organization has achieved A specific license that the organization has obtained One of the benefits to the above approach is that it allows system 100 to propose counter-factual answers to the user. For example, the system may suggest to the user that "If you enacted this policy with these controls you could answer the question of the RFP with a given industry best-practice answer". Explained further, answer conditions specify the characteristics of the organizations on system 100 along with their association with a given root answer.

When an organization wishes to use a root answer previously used by other tenants/organizations, the system can suggest how well accepted or how much of an industry accepted best practice a given root answer or specifically a given policy control or policy itself is. Furthermore, root answers have ratings of how well they are liked by the community of users belonging to various organizations onboarded on system 100 or by the frequency with which they result in a successful RFP. Of course, no PII or identifying data is released from one organization to another without anonymization/masking.

In a similar manner to a literal question, a "literal answer" is a way of expressing the root answer so that it matches the formatting or the template of its corresponding document, such as new RFP 104 of FIG. 1. For instance, if the root answer is "yes", then the literal answer can be "y" or "yes" depending on the format of the RFP.

For explanatory purposes, here is a concrete example of an excerpt from an RFP in Microsoft Excel spreadsheet form:

|     | Security | Yes | No | NA | Notes |
| --- | --- | --- | --- | --- | --- |
| 1.1 | Does your organization have a password strength requirement? Describe. | | | | |
| 1.2 | ... | | | | |

So, the literal question extracted from the spreadsheet per above explanation is "Does your organization have a password strength requirement? Describe." Armed with the above-explained concepts, the following steps are executed for auto-answering this question based on the present techniques.

1. Find matching root questions. As a first step, system 100 employing its AI and insights engine 102 finds root questions matching this literal question using similarity/matching techniques of the present design. In one embodiment, employing keywords-based matching, exemplary matching root questions thus retrieved are as provided below:

| Confidence | Root Question | Keywords |
| --- | --- | --- |
| 100% | <ID: 1 PWD STRENGTH> | "Describe", "What", "password strength", "minimum strength", "password" |
| 90% | <ID: 2 HAS PWD POLICY> | "Have", "Has", "password strength", "minimum strength", "password" |
| ... | ... | |
| 5% | <ID: 6 CLEAN DESK POLICY> | "Have", "clean desk", "desk", "removal", "clear" |

In one embodiment, matches above a predetermined threshold or confidence level are highlighted while those below are dimmed out. Thus, in the above example, the first and second rows that are underlined will be highlighted while the other rows are dimmed out in the GUI.

2. Look up the root answers. A mapping table or tables contains all the answers associated with each of the root questions. Continuing with the above example, the mapping table may be as follows:

| Root Question ID | Root Answer ID |
| --- | --- |
| <ID: 1 PWD STRENGTH> | <ID: 1 NOREQS> |
| <ID: 1 PWD STRENGTH> | <ID: 2 BASIC POLICY> |
| <ID: 1 PWD STRENGTH> | <ID: 3 TWO FACTOR> |
| <ID: 2 HAS PWD POLICY> | <ID: 8 NO PWD POLICY> |
| <ID: 2 HAS PWD POLICY> | <ID: 9 HAS PWD POLICY> |
| ... | ... |
| <ID: 6 ... > | <ID: 13 ... > |

Notice that each root question and root answer has a respective unique identifier or ID. Further, root questions that were earlier matched with acceptable confidence level and their corresponding root answers are shown underlined. In a GUI, they may be shown as highlighted per above teachings, while other rows are dimmed out.

3. Evaluate answer conditions. Next, system 100 with its AI and insights engine 102 of FIG. 1 retrieves the conditions for each of retrieved root answers and evaluates their applicability one-by-one. For the above example, the organization has implemented Policy PH-01 and enabled/enacted controls for Two Factor Authentication (TFA). The following table lists the conditions associated with the above exemplary root answers.

Notice again the underlining of the applicable root answers. First and fourth rows are not underlined because the value of their answer conditions is false/n indicating that they do not match the organization's posture of having implemented Policy PH-01 and having enabled/enacted controls for Two Factor Authentication (TFA) per present example. Note further the ratings column indicating the rating of the answer in the community of users per above explanation.

The above aspects of finding matching root questions for RFP items, the root answers that map to the root questions, and the evaluation of the answer conditions is shown by block 216 of flowchart 200 of FIG. 2.

| Root Answer ID | Conditions | Type | Value | Summary | Rating | Conditions Met? |
|---|---|---|---|---|---|---|
| <ID: 1 NO REQS> | Policy PH-01 NOT implemented | Not Applicable | False n | | ☆☆☆☆☆ | No |
| <ID: 2 BASIC POLICY> | Policy PH-01 implemented | Boolean | Truth y | All organization services enforce minimum password requirements. | ★★★☆☆ | Yes |
| <ID: 3 TWO FACTOR> | Policy PH-01 implemented AND TFA control enabled | Boolean | Truth y | Two factor authentication in use for all employees in the organization. | ★★★★★ | Yes |
| <ID: 8 NO PWD POLICY> | Policy PH-01 NOT implemented | Boolean | False n | | ☆☆☆☆☆ | No |
| <ID: 9 HAS PWD POLICY> | Policy PH-01 implemented OR TFA control enabled | Boolean | Truth y | | ★★★☆☆ | Yes |

4. Answer phrasing. The system has thus identified three matching answers to the above-identified literal question of "Does your organization have a password strength requirement? Describe." from our new RFP 104 of FIG. 1. These are given below:

| Root Answer ID | Conditions | Type | Value | Summary | Rating | Conditions Met? |
|---|---|---|---|---|---|---|
| <ID: 2 BASIC POLICY> | Policy PH-01 implemented | Boolean | Truth y | All organization services enforce minimum password requirements. | ★★★☆☆ | Yes |
| <ID: 3 TWO FACTOR> | Policy PH-01 implemented AND TFA control enabled | Boolean | Truth y | Two factor authentication in use for all employees in the organization. | ★★★★★ | Yes |
| <ID: 9 HAS PWD POLICY> | Policy PH-01 implemented OR TFA control enabled | Boolean | Truth y | | ★★★☆☆ | Yes |

Based on the RFP spreadsheet, an excerpt from which was presented earlier, the system determines the presence of discrete answer value columns and a Notes column. Thus, it can express the answers to both of these questions as a Boolean value and a string of text respectively. In one embodiment, the Boolean value is the most frequent or mode of all root answer values. The answer text is a concatenation of all the summaries from the table. The result of the auto-generated response in the RFP looks as follows, and the question is marked complete by the system. This is shown by block 218 of flowchart 200.

| Security | Yes | No | NA | Notes |
|---|---|---|---|---|
| 1.1 Does your organization have a password strength requirement? Describe? | ✓ | | | All organization services enforce minimum password requirements. Two factor authentication in use for all employees in the organization. |
| 1.2 ... | | | | |

To summarize, while still referring to flowchart 200, for each question/item of new RFP 104 the system finds matching items from all existing documents, which are presented to the user. For each given RFP question, a selection of an item marks the question complete. If still unanswered questions remain, the system attempts to fill in the answers to the questions based on the root question analysis presented in this section and per blocks 216 and 218. The root question analysis utilizes the present concepts of root questions, mapping root answers and answer conditions, literal questions, literal answers and associated teachings.

An alternative embodiment of system 100 of FIG. 1 of the present design executes blocks 210, 212 and blocks 216, 218 of flowchart 200 in parallel. In such an embodiment, system 100 auto-answers the RFP questions based on corpuses 112, 114, 116 and 118 per above teachings as well as root question analysis of blocks 216 and 218 provided above, in a parallel. A list of all the generated answers from both processing logics is then presented to the user corresponding to each question/item of RFP 104 for manual selection.

For completeness, the GUI of the system allows the user to manually answer/update/override any of the auto-answered responses of the teachings if required.

For matching or finding similarity of individual questions to the existing documents, specifically to their questions/items, as well as for finding matching root questions for an RFP question/item per above, system 100 and specifically its AI and insights engine 102 employs one or more of a number of techniques. One or more of these may be chosen for a given implementation, and include:

1. Cosine similarly measurement. With the texts of the documents tokenized, TFIDF of the tokens measured and stored as metadata per above teachings, engine 102 uses the familiar measure of cosine similarity to determine the similarity between two documents. Specifically, it computes cosine similarity based on TFIDF, between the current question of new RFP 104 being answered and the constituent questions/items of all the documents in database 110. If the computed similarity measure is above a predetermined threshold, for example 0.8, then the respective items are considered similar/matching, otherwise not. Such an approach may also be extended to topic modeling to determine what topics the items belong to.

2. NER-based or keywords-based similarity measurement. As another measure of similarity used by engine 102, two items are determined to be similar or not by observing the terms or named entities shared by them. Recall, that all documents are also preprocessed through a NER step and the resulting terms/keywords/named entities are stored as metadata in database 110 along with their respective weights. Now, if (number of shared named entities x respective weights of the shared named entities) between two documents, and specifically their two respective items being matched, is above a predetermined threshold, then they are considered similar/matching.

To understand this further, consider the following three items and the respective named entities extracted from or associated with them:
a. Item-1: password, encrypted, support hours
b. Item-2: password, encrypted, network encryption
c. Item-3: recovery, support hours Now, item-1 and item-2 are considered similar by AI and insights engine 102 of FIG. 1, because they share multiple terms in common, such as "password" and "encrypted". However, even though item-1 and item-3 only share one term in common, it is possible that this term is less common and is given a higher weight. Thus, since item-1 and item-3 share only one term, but that term is highly weighted, item-1 and item-3 are also considered similar.

Thus, using the above NER-based similarity measurement approach, system 100 retrieves all documents from database 110 that have items similar or matching to the question of new RFP 104 being answered.

3. Machine learning based classification. Machine learning based classification techniques are also employed by AI and insights engine 102 in determining similarity between the questions of the RFP and the questions/items of existing documents. With labeled data of tagged questions/items provided by human experts per above explanation, the possible techniques for matching include Naive Bayes, k-nearest neighbors (kNN), SVM and Random Forest.

Security Gaps and Compliance Monitoring:

Referring back to FIG. 1, a key capability of system 100 is auto-answering a new RFP 104 to produce completed or answered RFP 106 for security/privacy domains per above teachings. Such a capability is absent from the teachings of the prior art. The other related and highly useful functionality provided by system 100 is that of security gaps and compliance monitoring and is accrued as a result of monitoring module 120 working in conjunction with AI and insights engine 102. This functionality is also an innovative aspect of the present design and absent from the teachings of the prior art.

Figure 3:
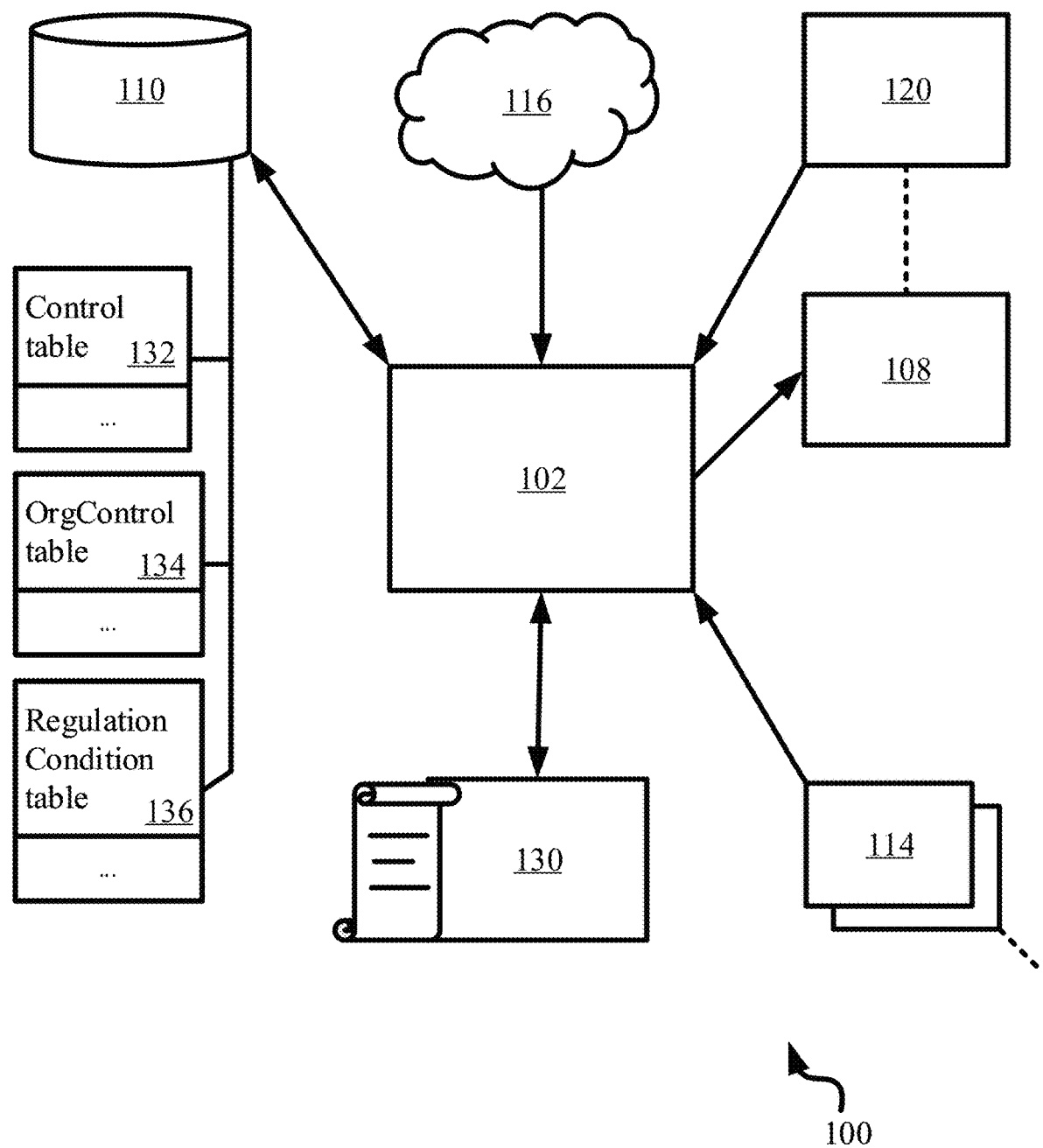
FIG. 3 is a variation of the block diagram of FIG. 1 emphasizing the use of a survey wizard and other elements related to compliance monitoring according to the present techniques.

To understand this functionality of the present design better, let us take advantage of FIG. 3.

FIG. 3 shows monitoring module 120 and other elements with their reference numerals drawn from FIG. 1. The rest of the elements from FIG. 1 have been left out for clarity of explanation and to emphasize the elements associated with compliance monitoring of the present discussion. In order to determine gaps in the privacy and/or security posture of an organization, the present design uses a security/privacy survey and an associated survey wizard 130 as shown in FIG. 3. Survey wizard 130 is typically run when the organization is being on-boarded onto system 100 in a SaaS environment per prior teachings. Alternatively, or in addition, wizard 130 is run by the organization on a periodic basis, for example, on an annual basis or on an ad-hoc basis.

When invoked, wizard 130 presents a series of questions to the organization in a survey. In specific embodiments, the survey may be precipitated by a human resources (HR), financial or information technology (IT) audit occurring or desired in the organization. The questions require the admin/user to answer whether certain policies have been implemented or certain set of controls have been enabled/enacted with the purpose of discovering security/privacy gaps or risks in the current security/privacy posture of the organization. In response to the survey, the user answers these questions in a manner analogous to the auto-answer functionality taught earlier.

More specifically, the following set of actions are taken:
1. User runs wizard and is presented with the survey questions.
2. Per above teachings related to RFP auto-answering functionality, system 100 finds policies from corpus 114 of stock policies of FIG. 1 that match each survey question. The matching questions/items or controls of the policy are suggested to the user as responses. If the user selects a matching response, the question is marked complete.
3. If the system cannot find a matching item from the stock policies for the survey question, the system recommends policies from corpus 116 of externally sourced security/privacy documents. Specifically, AI and insights engine 102 searches for:
   a. Matching IT security/privacy policies from a peer organization of above teachings. If a peer policy is selected in an anonymized manner per above teachings, then the system recommends updating an existing policy of the organization if necessary or creating a new policy with the controls required to gain compliance with the peer policy. The system then creates policy/controls for review. Next, the user marks the new policy as applicable and implements its controls, and the question is marked complete. Otherwise, the processing continues.
   b. One of industry accepted security/privacy frameworks residing in corpus 116 of externally sourced documents. If selected, the system recommends updating an existing policy if necessary or creating a new policy with the controls required to gain compliance. The system then creates policy/controls for review. Next, the user marks the new policy as applicable and implements its controls, and the question is marked complete.

Once the survey has been completed, any unimplemented controls of the selected policies per above, and/or any unanswered questions or the survey, are identified as gaps/risk in the security posture of the organization. These are incorporated into observed security/privacy gaps/risk results 108 of the analysis and provided to the user along with applicable recommendations to overcome them. The recommendations/feedback may include creating new policies or controls to address the gaps and/or implementing the required controls of already existing stock policies, as an example. Additionally, the recommendations/feedback may include implementing the required controls of an externally sourced policy framework/standard, etc.

In addition, system 100 and specifically its monitoring module 120 also performs real-time monitoring of the compliance of the organization to security standards and industry regulations. Specifically, changes occasionally occur in public compliance standards or guidelines where new policy text or controls are updated. For example, if a new version of the National Institute of Standards and Technology (NIST) Cybersecurity Framework is published, the system alerts the relevant users or admins of the organization onboard its SaaS platform of the change/update event. It subsequently identifies the gaps in the existing implemented policies as well as impact on any RFP responses that depended on those implemented policies when compared to the revised standard.

To accomplish this, system 100 is updated with the new regulation or the recommended controls in the new regulation. It then classifies the level of change using appropriate tags and identifies which policy controls or categories of controls will be impacted. It then checks all implemented policies and controls on file/stock, flags the matching policies and annotates the changes in text or suggests new text for affected policies. For this purpose, it utilizes techniques provided above in reference to RFP auto-answering functionality, including using the concepts of root questions/answers.

System 100 then sends an alert message to the administrator of each onboarded organization, providing them the updated language. It also alerts each administrator as to which RFPs are impacted by the change in policy due to the revision of the standard/regulation.

The present techniques are thus effectively deployed to monitor the compliance of the organization to a variety of industry standards as required for specific embodiments. Such industry standards include but are not limited to Health Insurance Portability and Accountability Act (HIPAA), Payment Card Industry (PCI), General Data Protection Regulation (GDPR), NIST standards, etc.

Let us now review the compliance monitoring capability/functionality of the present design in even greater detail. For this purpose, let us look at a table of the instant database schema responsible for holding security/privacy controls. As will be apparent, this Control table has an ID column to uniquely identify each control:

| ID | Control Type | Description |
|----|--------------|-------------|
| 1 | TWO_FACTOR_CUSTOMER_DATA | Org requires two factor authentication on all customer data stores |
| 2 | MIN_PASSWORD_LENGTH | Org requires minimum password length on all internal services |
| 3 | ... | ... |

When an organization implements a control, a corresponding record is created in OrgControl table:

| Org ID | Control ID | Status | Value | Implemented At |
|--------|-----------|--------|-------|----------------|
| 45 | 1 | IMPLEMENTED | null | 2018 Jan. 1 |
| 45 | 2 | IMPLEMENTED | 8 | 2018 Jan. 1 |
| 46 | ... | ... | ... | ... |

Now, when a new version of a policy with additional controls is published by the system, the OrgControl table is updated with the new controls for each organization but its status is set to NOT_IMPLEMENTED:

| Org ID | Control ID | Status | Value | Implemented At |
|---|---|---|---|---|
| 45 | 1 | IMPLEMENTED | null | 2018 Jan. 1 |
| 45 | 2 | IMPLEMENTED | 8 | 2018 Jan. 1 |
| 45 | 12 | NOT_IMPLEMENTED | null | Null |
| 46 | ... | ... | ... | ... |

Thus, the system monitors the presence of unimplemented controls within each organization and identifies them as security/privacy gaps and notifies their admins accordingly.

In a similar manner, the task of evaluating regulatory compliance is achieved by having a RegulationCondition table holding the conditions required to satisfy a regulation. For example:

| Regulation | Control ID | Conditions |
|---|---|---|
| ABC-123 | 1 | IMPLEMENTED |
| ABC-123 | 2 | IMPLEMENTED and VALUE >8 |
| ABC-124 | ... | ... |

An organization satisfies a regulation if all its conditions are met. For monitoring compliance viz-a-viz industry regulations, the system or a human expert regularly monitors the respective websites or online resources where new regulations or updates to existing regulations are published. The system or human expert can determine if a particular document or website has been updated.

If the human/system detects an updated document or website, it then can either alert human admins to add/update the conditions to the RegulationCondition table when there is a new regulation or changes to an existing one.

The system then reevaluates the conditions against each organization in the system and duly notifies admins of controls which require implementing. For instance, the RegulationCondition table as shown below now holds a row for a new regulation that was recently discovered by the system along with the associated conditions required for meeting/satisfying it:

| Regulation | Control ID | Conditions |
|---|---|---|
| ABC-123 | 1 | IMPLEMENTED |
| ABC-123 | 2 | IMPLEMENTED and VALUE >8 |
| BCD-234 | 13 | IMPLEMENTED |

FIG. 3 further shows above exemplary Control table 132, OrgControl table 134 and RegulationCondition table 136 of the present discussion explicitly.

Furthermore, when changes to a control are made within an organization, the system reevaluates the conditions on all answers previously selected in completed RFPs and notifies the respective admins of changes that invalidate any previously answered questions. In this way, forward compliance of past RFPs is safeguarded.

Figure 4:
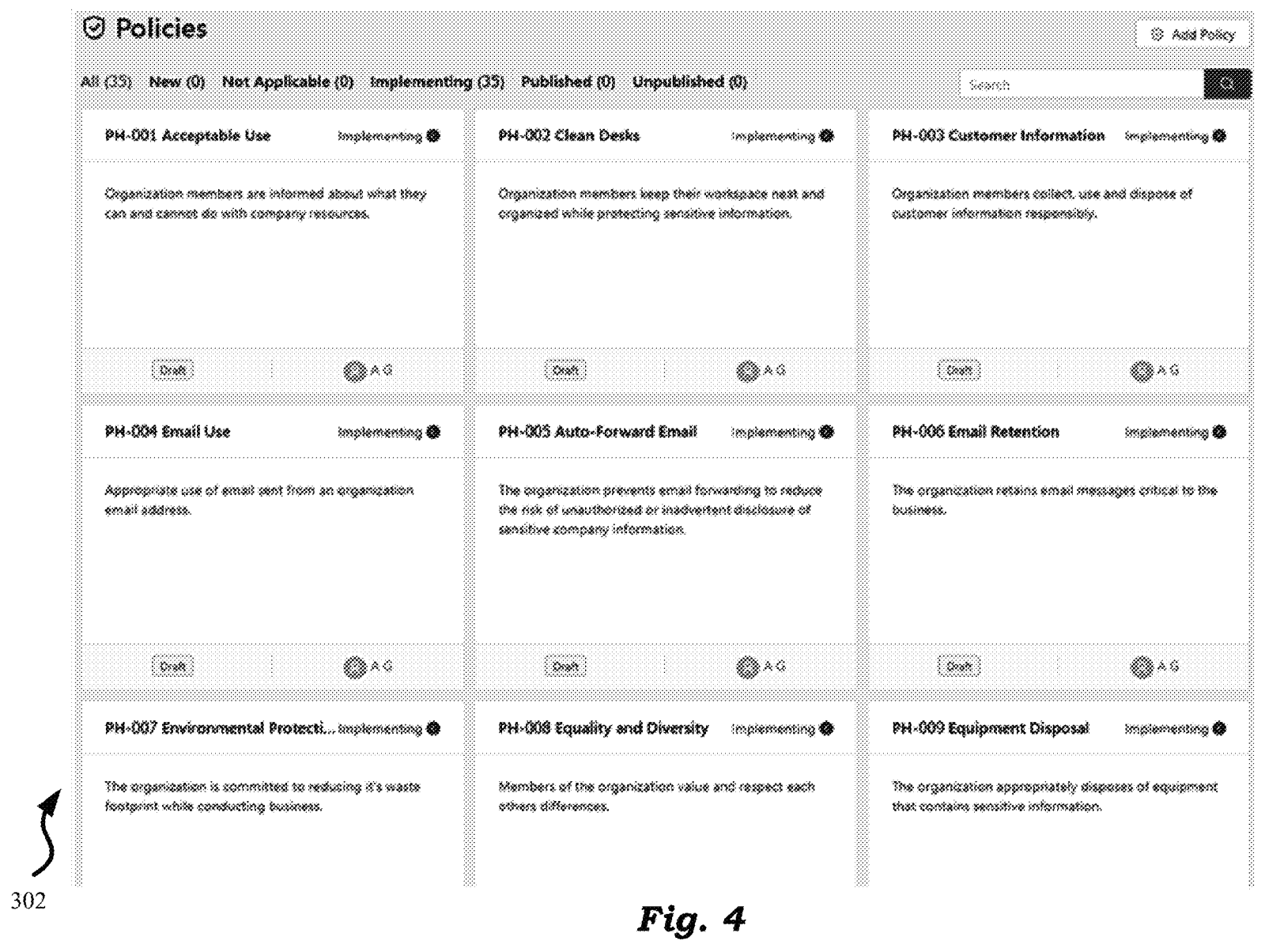

For completeness, FIG. 4 presents a screenshot 302 of an implementation of the instant techniques showing various stock policies at a high-level. FIG. 5 shows a portion 304 of a detailed view of an exemplary stock password policy and FIG. 6 shows its requisite controls 306. Similarly, FIG. 7 shows a portion 308 of a detailed view of an exemplary customer information policy while FIG. 8 shows the associated controls 310 of that policy.

The above teachings are provided as reference to those skilled in the art in order to explain the salient aspects of the invention. It will be appreciated from the above disclosure that a range of variations on the above-described examples and embodiments may be practiced by the skilled artisan without departing from the scope of the invention(s) herein described. The scope of the invention should therefore be judged by the appended claims and their equivalents.

The invention claimed is:

1. A multi-tenant software as a service (SaaS) web-application system comprising computer-readable instructions stored in a non-transitory storage medium and at least one microprocessor coupled to said storage medium for executing said computer-readable instructions, said at least one microprocessor configured to:
 (a) in one of an automatic and a semi-automatic manner, provide a response to a question of a new request for proposal (RFP) document received by an organization, by utilizing a machine learning algorithm to find matching items to said question, said matching items belonging to one or more elements comprising a corpus of prior RFP documents that said organization or a peer organization has responded to, a corpus of stock policies of said organization, a corpus of externally sourced documents and one or more admin-inputs;
 (b) auto-answer said question of said new RFP based on said matching items; and
 (c) utilize a monitoring module and a survey wizard to monitor compliance of said organization to a set of controls to identify any gaps in said compliance;
wherein said new RFP, said corpus of prior RFP documents, said stock policies, said admin-inputs and said set of controls are related to one or both of a security and a privacy domain, and stored in a database.

2. The system of claim 1 wherein said set of controls are prescribed in said new RFP.

3. The system of claim 1 wherein said set of controls are prescribed in an externally sourced regulatory standard.

4. The system of claim 3 wherein said set of controls are related to one of a Health Insurance Portability and Accountability Act (HIPAA) standard, a National Institute of Standards and Technology (NIST) standard, a Payment Card Industry (PCI) standard and a General Data Protection Regulation (GDPR) standard.

5. The system of claim 1 wherein said set of controls are related to at least one of a Human Resources (HR) audit, a financial audit and an IT audit of said organization.

6. The system of claim 1 wherein said corpus of externally sourced documents include at least one peer policy accessed in an anonymized manner.

7. The system of claim 1 wherein said machine learning algorithm employs a technique selected from the group consisting of Naive Bayesian, k-nearest neighbors (kNN), support vector machines (SVM), deep learning using Deep Structured Semantic Model (DSSM), named entity recognition (NER) and natural language processing (NLP).

8. The system of claim 1 wherein at least one actionable item is identified in said new RFP based on its structural features.

9. The system of claim 1 wherein said question of said new RFP is matched to one or more root questions in said database.

10. The system of claim 9 wherein each of said one or more root questions is mapped to a corresponding root answer.

11. A computer-implemented method executing computer-readable instructions by at least one microprocessor, said instructions stored in a non-transitory storage medium coupled to said at least one microprocessor, and said method comprising the steps of:

(a) in one of an automated and a semi-automated manner, providing a response to a question of a new request for proposal (RFP) document received by an organization, by utilizing a machine learning algorithm for finding matching items to said question, said matching items belonging to one or more elements comprising a corpus of prior RFP documents that said organization or a peer organization has responded to, a corpus of stock policies of said organization, a corpus of externally sourced documents and one or more admin-inputs;

(b) auto-answering said question of said new RFP based on said matching items;

(c) monitoring compliance of said organization to a set of controls for identifying gaps in said compliance; and (d) storing said corpus of prior RFP documents, said stock policies, said admin-inputs and said set of controls in a database and providing them to be related to one or both of a security and a privacy domain.

12. The method of claim 11 having said set of controls prescribed in said new RFP.

13. The method of claim 11 having said set of controls prescribed in an externally sourced policy standard.

14. The method of claim 13 having said set of controls related to one of a Health Insurance Portability and Accountability Act (HIPAA) standard, a National Institute of Standards and Technology (NIST) standard, a Payment Card Industry (PCI) standard and a General Data Protection Regulation (GDPR) standard.

15. The method of claim 11 further decomposing said corpus of prior RFP documents, said corpus of stock policies and said corpus of externally sourced documents into their constituent items before said storing in said database.

16. The method of claim 11 utilizing for said monitoring, a monitoring module and a wizard for performing a security/privacy survey for said organization.

17. The method of claim 11 having said machine learning algorithm utilizing a technique selected from the group consisting of Naive Bayesian, k-nearest neighbors (kNN), support vector machines (SVM), deep learning using Deep Structured Semantic Model (DSSM), named entity recognition (NER) and natural language processing (NLP).

18. The method of claim 11 matching said question of said new RFP to one or more root questions in said database.

19. The method of claim 18 mapping each of said one or more root questions to a corresponding root answer.

20. The method of claim 19, further providing recommendations to said organization for overcoming said gaps.

21. A multi-tenant software as a service (SaaS) web-application system comprising computer-readable instructions stored in a non-transitory storage medium and at least one microprocessor coupled to said storage medium for executing said computer-readable instructions, said at least one microprocessor configured to:

(a) in one of an automatic and a semi-automatic manner, provide a response to one or more questions of a new request for proposal (RFP) document received by an organization, by utilizing one or more machine learning algorithms to find matching items to said one or more questions, said matching items belonging to one or more elements comprising a corpus of prior RFP documents that said organization or a peer organization has responded to, a corpus of stock policies of said organization, a corpus of externally sourced documents and one or more admin-inputs;

(b) auto-answer said one or more questions of said new RFP based on said matching items; and (c) utilize a monitoring module to monitor compliance of said organization to a set of controls to identify gaps in said compliance;

wherein said new RFP, said corpus of prior RFP documents, said stock policies, said admin-inputs and said set of controls are related to one or both of a security and a privacy domain, and are stored in a database.

* * * * *